April 4, 1939. W. H. CHAMBERLAIN 2,153,235
SHOE HEEL COUNTER MOLDING MACHINE
Filed June 17, 1937 3 Sheets-Sheet 1
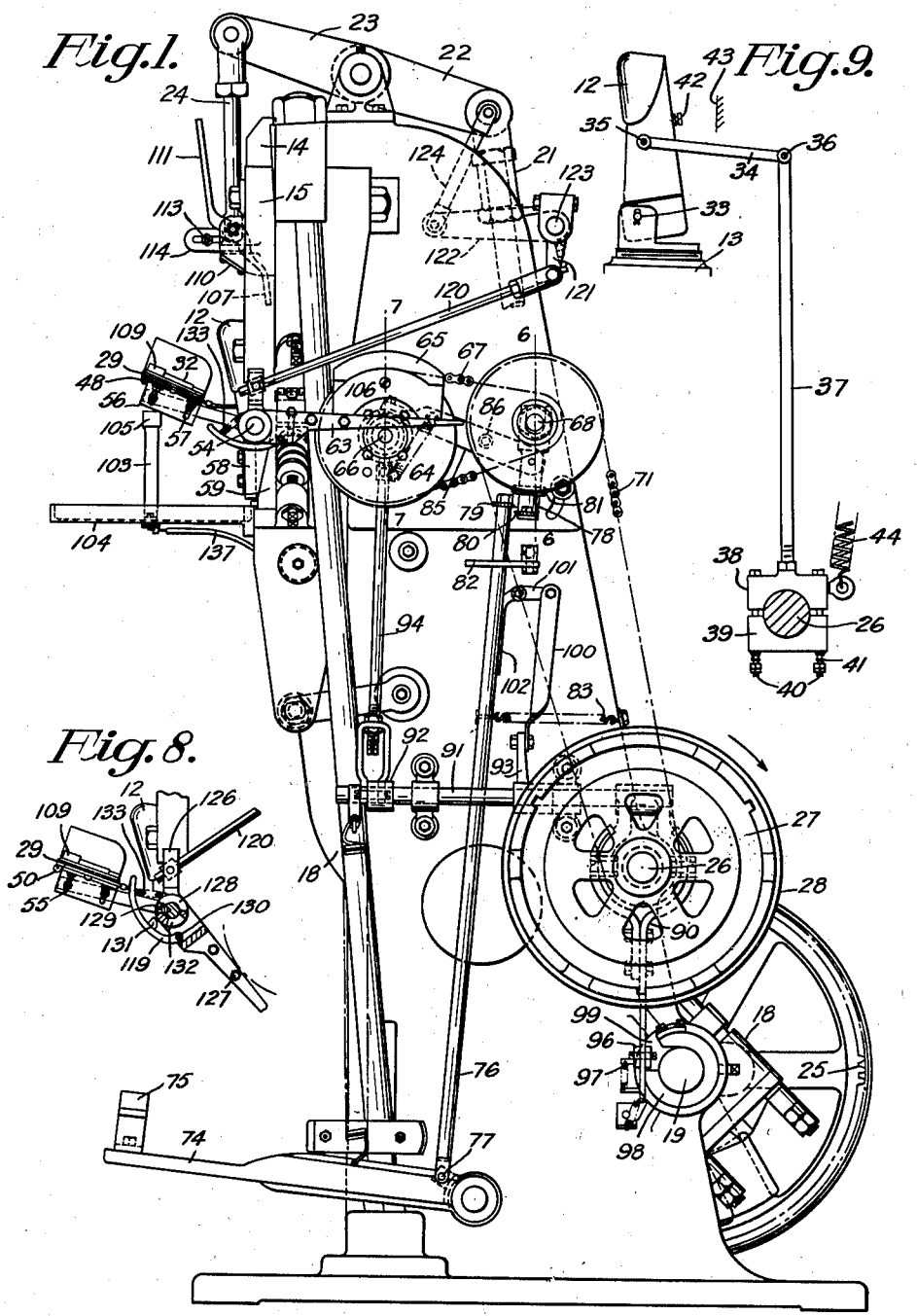
Inventor:-
William H. Chamberlain,
By: Smith, Michael & Gardiner,
Attorneys April 4, 1939. W. H. CHAMBERLAIN 2,153,235
SHOE HEEL COUNTER MOLDING MACHINE
Filed June 17, 1937 3 Sheets—Sheet 2
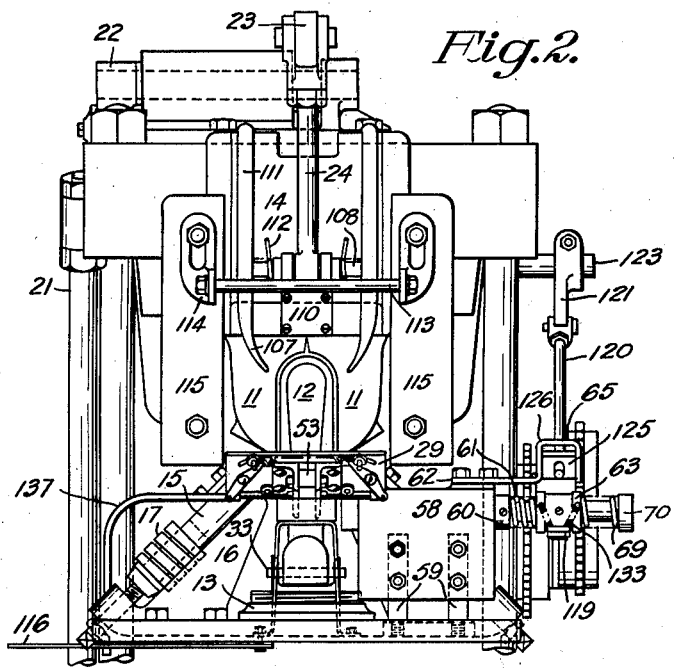
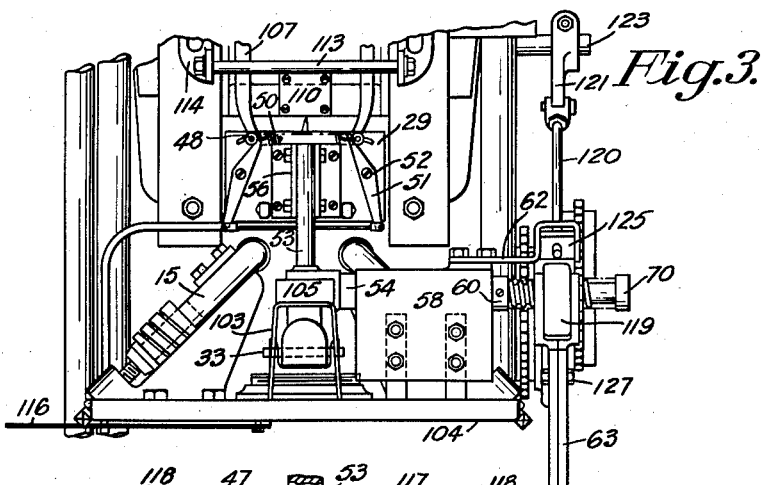
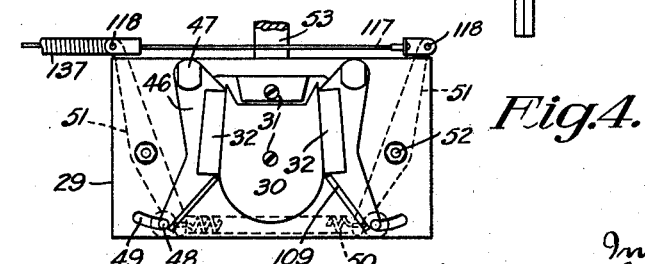

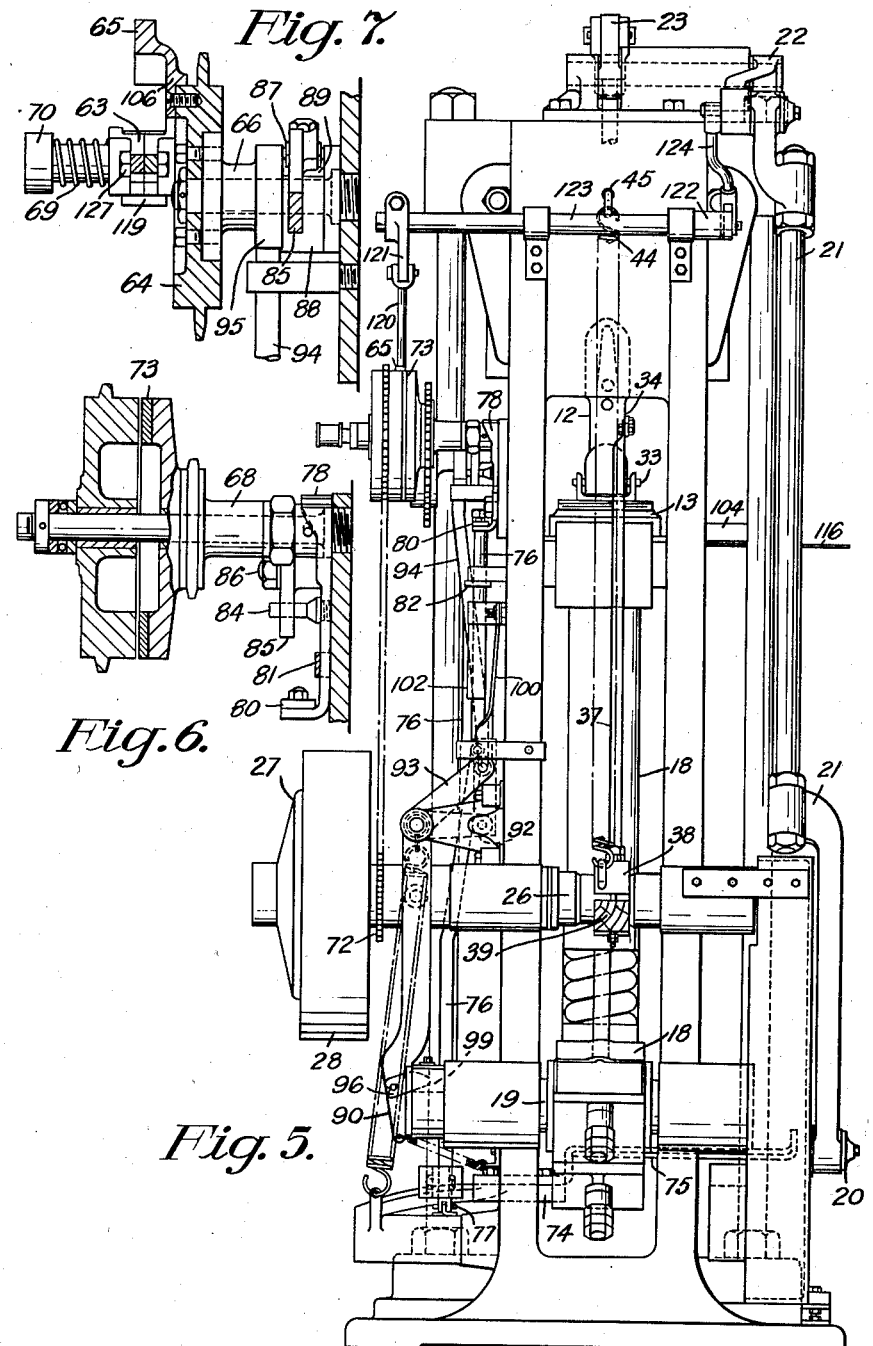

Patented Apr. 4, 1939

2,153,235

UNITED STATES PATENT OFFICE 2,153,235

SHOE HEEL COUNTER MOLDING MACHINE

William Hedger Chamberlain, Higham Ferrers, England

Application June 17, 1937, Serial No. 148,795
In Great Britain November 18, 1936

16 Claims. (Cl. 12—66)

This invention relates to machines for molding counters for shoe heels, and more particularly to machines of the Stewart type.

The invention has for its main object to provide automatic means for presenting the counter blanks to the mold by a carrier which is moved towards and away from the mold in timed relation to the descent of the wiper. Another object is to provide means whereby the movement of the carrier towards the mold is effected mechanically subsequent upon the actuation of a pedal or the like to engage the drive to the machine, and whereby the carrier is disengaged from the blank and then moved away from the mold, after the blank has been gripped in the latter, the molded counter being delivered automatically. The invention also comprises means whereby the drive is disengaged automatically at the completion of each molding operation, so as to allow for the insertion of a fresh blank.

Other objects and advantages of the invention will appear from the following description of one embodiment of the invention, given with reference to the accompanying drawings, in which:

Fig. 1 is a side elevation of the molding machine.

Fig. 2 is a partial front elevation of the machine.

Fig. 3 is a similar view showing the carrier or presenter device in its raised position.

Fig. 4 is a plan of the presenter device on a larger scale.

Fig. 5 is a rear elevation of the machine.

Figs. 6 and 7 are part sectional views on the lines 6—6 and 7—7 respectively of Fig. 1.

Fig. 8 is a detail showing the operation of a safety device.

Fig. 9 is a detail showing an automatic control of the hinged center piece of the mold.

Referring to Figs. 1, 2 and 5, the molding machine illustrated is of the known Stewart type, in which the mold is composed of a pair of jaws 11 rocking inwardly together on either side of a center piece 12, the counter blank being gripped in the gap between the parts of the mold, in conjunction with vertical pressure applied from the bottom of the center piece by a plunger 13, so as to conform the fiber or other material of the counter to the desired shape, while the curved edge projecting from the mold is flanged over by a door or wiper slide 14 fitted with a wiper plate, which descends over the front face of the mold. The closing movement of the mold jaws 11 is produced by a pair of roller-fitted side pressers 15 mounted on inclined slides 16 with buffer springs 17, these slides being arranged one on each side of the bottom plunger and rising and falling with the latter. The plunger is operated by an eccentric rod 18 from the middle of the bottom shaft 19, while a crank pin 20 on the latter operates a connecting rod 21 controlling the wiper slide 14 through rocking levers 22, 23 and a link 24; the shaft 19 is driven by gearing 25 from a main shaft 26, the latter being driven through a clutch 27 by any suitable means, for example by belting upon the pulley 28.

According to the invention, the presentation of the blanks to the mold is effected by a carrier or presenter device, which in the form of construction illustrated in Figs. 1 to 4 comprises a flat plate 29 having a shallow block 30 of U-shape or otherwise adapted to receive the blank partly around its perimeter when applied by hand, the plate 29 being then stationary in its lowered position (Figs. 1 and 2); the block 30 is secured in a detachable manner by screws 31, and two jaws 32 are mounted at the opposite sides of the block 30, adapted to engage the lower edge of a blank when fitted round the block. The height of the block 30 and jaws 32 is such that they grip the counter blank by the edge which normally projects from the mold, this being the portion of the blank which is subsequently flanged over by the wiper plate.

The center piece 12 is supported by a hinge 33 at the top of the plunger 13 and controlled by a link 34, pivotally connected thereto by a pin 35, the other end of the link being connected by a pin 36 to the top of a lever arm 37 having a frictional mounting upon the main shaft 26; this frictional mounting comprises a bronze cap 38 into which the arm 37 is screwed, with a wooden block 39, the cap and block being clamped upon the shaft 26 by bolts 40 acting through springs 41. The initial rotation of the shaft 26 at the start of the molding operation causes the lever arm 37 to pull back the center piece 12 in between the mold jaws 11, an adjustable stop 42 being provided to limit the inward movement by striking an abutment 43; after the molding operation is completed, the shaft 26 comes to rest and is then moved slightly back in the reverse direction by a spring 44 extending from one side of the cap 38 to an anchorage 45 at the upper part of the machine frame, this reverse movement throwing the center piece 12 outwards from the jaws 11 as soon as the pressure of the latter is released.

The jaws 32 upon the presenter plate 29 are carried by levers 46 pivoted on pins 47 adjacent to one edge of the plate, adjustable stops being provided if desired to limit the outward motion of the jaws away from the block 30, and the other ends of the levers are fitted with studs 48 extending through curved slots 49 adjacent to the opposite edge of the plate; beneath the plate these studs 48 are connected together by a tension spring 50 acting to pull the jaws 32 towards the block 30, and are also engaged by levers 51 pivoted at 52, whereby the jaws can be drawn away from the block. The presenter plate 29 is adjustably mounted upon a crank arm 53 secured to a horizontal rocking shaft 54 extending to one side of the machine, the crank arm being approximately in line with the center of the mold, as seen in Fig. 2; the crank arm is preferably of square cross-section, with transverse bolts 55 for clamping a pair of angle-section bearers 56 to which the plate 29 is itself bolted, slots 57 being provided in the bearers 56 in order to allow the presenter plate to be adjusted to the correct position.

The shaft 54 is rotatably mounted in a bracket 58, bolted against two vertical supports 59 fixed in front of one of the slides 16, the abutting faces of the bracket and its support being preferably inclined as seen in Fig. 1; a collar 60 secured on this shaft is engaged by a torsion spring 61 coiled around the shaft and anchored to a strap 62 bolted to the bracket 58. The outer end of this shaft 54 is fitted with another crank arm 63 set at about 180 degrees to the first, this second arm being normally fixed in relation to the shaft and to the first crank arm 53; the second arm 63 passes across a disc or wheel 64 fitted with a cam shoe 65 and mounted on a shaft 66 driven by a chain 67 from a countershaft 68 on the back of the machine. The spring 61 tends to raise the crank arm 63 towards the cam 65 and at the same time to lower the crank arm 53; a second similar torsion spring 69 is coiled around the projecting extremity of the shaft 54, this spring being engaged between the lever 63 and a collar 70 secured to the shaft, for a purpose hereafter explained.

The countershaft 68 is driven by a chain 71 from a sprocket 72 beside the pulley 28 upon the main shaft 26, the chain gearing to the countershaft and from the latter to the disc or wheel 64 being so proportioned that one revolution of the cam shaft 66 corresponds to one cycle of operations of the wiper door 14, that is to one revolution of the bottom shaft 19.

The countershaft 68 is fitted with a friction clutch 73 for conveying the drive through the chain 67 to the cam shaft 66, this clutch being controlled by the pedal 74 of the machine; a cross rail 75 bolted to the pedal and extending to the left hand side of the front of the machine enables the operator to work the pedal while seated somewhat to the left of the machine, to facilitate feeding the blanks into the carrier with the right hand. Depression of the pedal 74 causes a rod 76 pivotally connected thereto at 77 to actuate a sliding clutch fork 78 by the engagement of two teeth 79, 80 at their adjacent ends. The fork 78 is guided by a strap 81 and the rod 76 is guided by an eye-plate 82, both secured to the side of the machine frame, the eye or slot in this plate 82 being elongated to allow lateral movement of the rod 76 which is normally drawn by a spring 83 to a position for engagement of the teeth 79, 80; the rod 76 can however be shifted along the slot in the eye-plate 82 so as to disengage the teeth 79, 80 by means hereafter described. The clutch fork 78 is pivotally connected by a pin 84 to a lever 85 rocking upon a pivot 86, the other end of this lever being fitted with a shoe 87 pressing against a boss 88 upon the shaft 66; the boss 88 is cut away to leave a square-ended recess 89 in which the shoe 87 normally rests, thus acting as a stop for the cam shaft 66. When the clutch fork 78 is actuated by the pedal rod 76, the lever 85 is rocked to free the shoe 87 from the recess 89, the clutch 73 being thus kept in engagement for a complete revolution of the cam shaft, even though the pedal 74 be released; at the end of this revolution, the shoe 87 re-enters the recess 89 to stop the cam shaft simultaneously with the disengagement of the clutch 73 by the return of the clutch fork 78 connected to the same lever 85.

The clutch 27 for driving the main shaft 26 is controlled by a forked lever 90 secured upon a shaft 91 fitted with two cranks 92, 93; the crank 92 is connected to a push rod 94 adapted to be depressed by a cam 95 upon the shaft 66, the main clutch 27 being thus engaged for operation of the shaft 26 and of the bottom shaft 19 geared thereto. The lower end of the lever 90 is fitted with a pawl 96, controlled by a spring 97 and cooperating with a cam 98 on the end of the bottom shaft 19; this cam comprises a recess 99 into which the pawl 96 can sink when the lever 90 disengages the clutch 27 and the shaft 19 comes to rest in the raised position of the slide 14. When the lever 90 moves to engage the clutch 27, it withdraws the pawl 96 from its recess, and the rotation of the shaft 19 then maintains the face of the cam 98 against the pawl 96 so that the clutch remains engaged until the shaft 19 has completed one revolution; thereupon the pawl 96 sinks into its recess, allowing the clutch to disengage so that the machine comes to rest with the wiper in its raised position and the mold open. The crank 93, which constitutes a safety device, is connected by a link 100 to a bell crank lever 101 pivoted on the side of the machine frame, the vertical arm of this bell crank forming a shoe 102 upon which the pedal rod 76 rubs in its rising and falling movement; the rocking of the clutch control shaft 91 to engage the clutch 27 causes the shoe 102 to push aside the rod 76 against the pull of the spring 83, thereby disengaging the teeth 79, 80 to prevent the machine repeating another cycle of operations, even though the pedal 74 be kept depressed by the operator. Consequently only one revolution of the cam shaft 66 and one cycle of operations of the machine will be produced at each actuation of the pedal 74, whether this actuation be momentary or continued.

It will be understood that with the machine at rest, the door or wiper slide 14 being raised for admission of a blank carried by the presenter plate 29, both clutches 27, 73 are disengaged, but the driving belt for the pulley 28, and the driving chain 71 for the countershaft 68 are both running. Normally the spring 61 maintains both crank arms 53, 63, substantially horizontal, as seen in Fig. 1, the first one 53 holding the carrier plate 29 outwards towards the front of the machine, for convenient insertion of a blank; in this position, the plate 29 rests upon a saddle 103, bolted to a tray 104 projecting from the front of the machine frame, the saddle being fitted with a resilient pad 105. The second crank arm 63 can however be engaged by the face of the cam shoe 65 secured upon the face of the chain-driven disc 64, near its outer edge; this cam 65, which is normally stationary about the top of its circular path, as seen in Fig. 1, extends over an arc of about 90 degrees, and it is shown as integral with a web 106 by which it is bolted to the face of the disc or chain wheel 64.

Upon depression of the control pedal 74, the cam shaft 66 is set in motion by the chain drive, due to the engagement of the clutch 73, and the cam 65 forces down the second crank arm 63, against the action of the return-spring 61, thereby raising the first crank arm 53 with the presenter plate 29 and bringing the blank into the gap of the mold; in this position the blank can follow the upward movement of the mold as the bottom pressure is applied, by reason of the mounting of the shaft-supporting bracket 58 upon the rising and falling bed of the plunger 13. As the door or wiper slide 14 descends, and before it reaches the blank, the spring-connected arms 51 upon the presenter plate 29 are forced apart so as to release the jaws 32 holding the edge of the blank, by means of a pair of fingers or curved levers 107, mounted on a cross bar 108 which descends with the door, these fingers 107 engaging projections 109 upon the jaw levers 46; the presenter plate 29 is therefore left free to fall away from the mold, under the action of the spring 61, as soon as the cam 65 allows the second crank arm 63 to return to its normal position, but in case the plate 29 should fail to move, it may be pushed away clear of the wiper by an oblique striker plate 110 fitted to the lower edge of the door 14.

The fingers 107 serving to release the spring jaws 32 upon the carrier plate are pivotally mounted upon the cross bar 108 and provided with upward extensions or tail pieces 111 curved over the front of the machine, springs 112 being coiled around the pivot 108 so as to hold back the fingers 107 against the jaws 11 and force the tail pieces 111 forward; a fixed cross bar 113 secured upon brackets 114 on the stationary wiper guides 115 engages these curved extensions or tail pieces 111 as they descend with the wiper, and thereby rocks the fingers 107, causing them to make the plate 29 fall forward in time to avoid the descending door.

In addition to the automatic release of the spring jaws 32 as the door descends, suitable provision is made for the control of these jaws, so that they can be opened to allow insertion of a blank when the presenter plate lies forward in its approximately horizontal position and then closed as or before the plate is raised towards the position for presenting the blank to the mold.

As shown in Figs. 2, 3 and 4, the jaws 32 are opened by a Bowden wire mechanism 137, operated by a handle 116, the tensioning of the wire 117 drawing together the ends 118 of the levers 51, and the other ends of these levers engaging the studs 48, so that the levers 46 are forced apart to open the jaws 32; upon release of the handle 116, the spring 50 draws the levers 46 together, thus causing the jaws 32 to close upon the blank. If preferred, the jaws may be controlled automatically in relation to the rocking movement of the presenter plate 29; for example, the spring jaws may be controlled by a link extending from a point on the carrier plate to a point upon the center of the mold, at a suitable distance from the pivotal axis of the plate, so that this link produces the required movements to open and close the jaws. Again, the jaws may be controlled by compressed air or other convenient means.

After insertion of a blank and closing of the jaws 32, the actuation of the pedal 74 engages the clutch 73 upon the countershaft 68, causing the latter to transmit motion through the chain 67 to the cam shaft 66; the later rocks the crank arm 63 and shaft 54 of the carrier plate 29, as above described, and also operates the connecting rod 94 to engage the main clutch 27 conveying the drive through the shafts 26 and 19 to the door or wiper slide 14, this clutch being disengaged again automatically by the pawl 96 at the completion of one revolution of the bottom shaft 19. It will be noted that the pawl 96 is pivoted to the lever 90 so that in the event of reverse movement of the shaft 19, the pawl can yield to escape damage; the spring 97 normally holds the pawl in a projecting position for engagement with the cam 98, as seen in Fig. 5.

In order to facilitate the removal of the molded counter, the center piece 12 is automatically rocked upon its hinge 33 by the action of the spring 44, so that it moves forward to the position shown in Figs. 1 and 9 when the machine comes to rest after the molding operation; the center piece is drawn inwards again by the control arm 37 at the start of the next operation. It will be understood that the presenter plate 29 also operates in the normal sequence to push in the center piece; but in the event of either clutch sticking or seizing up, the frictionally mounted control arm 37 will operate to pull in the center piece 12 by the link 34 prior to the descent of the wiper slide.

A further safety device is provided by a ratchet lever 119 for latching the above-mentioned second crank arm 63 to the shaft 54, this ratchet lever being controlled by a rod 120 worked by levers 121, 122, a cross shaft 123 and a link 124, in timed relation to the sliding door, the forward end of this rod 120 being guided in a trunnion block 125 mounted in a cranked portion 126 of the strap 62.

The crank arm 63 is shown as being made in two halves, secured together back to back by bolts 127, the ends fitted upon the shaft being loose thereon and spaced apart to receive a collar 128 secured to the shaft, for example by a screw 129; the ratchet lever 119 is pivotally mounted at 130 between the two halves of the crank and provided with a tooth 131 engaging in a recess 132 in the collar 128, the ratchet lever 119 being normally retained in the engaged position by a pair of springs 133, so that the crank arm 63 is latched to the collar and shaft 54. The second torsion spring 69 engaged between the crank 63 and the collar 70, tends to rotate the shaft 54 in a direction to bring the presenter plate away from the mold, but its action is normally suppressed by the positive engagement of the ratchet lever 119 with the collar 128.

As seen in Fig. 8, the rod 120, which reciprocates in unison with the movements of the door 14, operates to disengage the shaft 54 from the crank arm 63 if the latter fails to keep in phase with the door 14 from any cause such as breakage of either chain 67 or 71, shearing of the chain sprocket driving bolts or the like, or slipping of the clutch 73; the rocking of the lever 119 by the advancing extremity of the rod 120 then lifts the tooth 131 from the recess 132 in the collar, so that the presenter plate will fall forward under the action of the second torsion spring 69, and can if necessary be pushed aside by the striker plate 110 on the descending door, without damage to the parts.

In the normal operation, the machine comes to rest after each delivery of a molded counter, the presenter plate being then in its approximately horizontal position and the center piece 12 rocked forwards from the mold jaws 11 by the action of the lever arm 37; the operator opens the jaws 32 of the presenter device by pushing forward the handle 116 of the Bowden wire mechanism, while holding an unmolded counter blank ready to slip its edge round the block 30 and between the jaws 32, in which position it is held by the closing of the jaws when the handle 116 is released. The pedal 74 is then depressed, engaging the clutch 73 and setting the cam shaft 66 in motion. The revolving cam 65 rocks the shaft 54 so as to lift the presenter plate 29 to the face of the mold, and thus inserts the counter blank between the center piece 12 and the outside jaws 11 of the mold; at this moment the cam 95 acts to depress the crank 92 and engage the main clutch 27, so that the center piece 12 is rocked inwards by the start of the main shaft 26, while the cam shaft 66 continues to revolve. The presenter plate is held close against the mold by the counter trapped in the two sets of jaws 32, 11—12, until the descending door or wiper slide 14 opens the jaws 32 by the levers 107 pressing against the projections 109. As the further descent of the door brings the tails 111 of the levers 107 against the fixed bar 113, the levers rock upon their pivot 108, so that the presenter plate 29 (now freed from the counter blank) is pushed away by the lower ends of these levers, if not already thrown forward by the action of the torsion spring 61, in readiness for the next operation. The shaping of the counter by the mold jaws 11, center piece 12 and wiper plate of the door 14 takes place in the customary manner, the molded counter being released and delivered by the outward movement of the center piece 12 when the machine comes to rest.

In the event of chain breakage or slipping of the clutch 73, whereby the cam shaft 66 fails to complete its revolution at the same time as the bottom shaft 19, the safety rod 120 coupled to the wiper plate mechanism will disengage the ratchet lever 119 and enable the presenter plate 29 to be pushed away in the normal sequence by the operation of the levers 107.

Adjustments for various widths of seat on the counter are provided by the slotted holes 57 in the bearers 56, and for different sizes of counter by exchange of the detachable block 30 and movement of the jaw levers 46 to suit.

What I claim is:

1. A shoe heel counter molding machine, comprising a mold, means for opening said mold by separating its parts to leave a narrow gap between them and for subsequently closing said mold, a wiper adapted to rise and fall over the face of said mold, a clutch controlling said opening and closing means and said wiper, means for engaging said clutch, a carrier having an upward rocking movement for presenting a counter blank to said mold, said carrier including jaws adapted to engage a counter blank by the edge normally projecting from the mold, means for rocking said carrier towards said mold, the rocking movement of said carrier towards said mold causing said counter blank to enter edgewise in the gap between the parts of said mold, said jaws retaining their engagement with said edge after the remainder of the blank has entered into said gap, mechanical means for operating said clutch engaging means and subsequently operating said rocking means, and means for disengaging said jaws in advance of the fall of said wiper.

2. A shoe heel counter molding machine, comprising a mold, means for opening said mold by separating its parts to leave a narrow gap between them and for subsequently closing said mold, a wiper adapted to rise and fall over the face of said mold, a clutch controlling said opening and closing means and said wiper, means for engaging said clutch, a carrier having an upward rocking movement for presenting a counter blank to said mold, said carrier including jaws adapted to engage a counter blank by the edge normally projecting from the mold, means for rocking said carrier towards said mold, the rocking movement of said carrier towards said mold causing said counter blank to enter edgewise in the gap between the parts of said mold, said jaws retaining their engagement with said edge after the remainder of said blank has entered into said gap, mechanical means for operating said clutch engaging means and subsequently operating said rocking means, means for disengaging said jaws in advance of the fall of said wiper, and supplementary means for moving said carrier away from said mold subsequent to the operation of said disengaging means.

3. In a counter molding machine of the character described, a shaft operating the molding means, a carrier for presenting a counter blank to the mold, means for moving said carrier towards and away from the mold, means for disengaging the blank from said carrier in advance of the descent of the wiper, means controlled by said shaft for bringing the machine to rest at the end of each molding operation, and means for rocking the center piece of the mold to deliver the molded counter when the machine comes to rest.

4. In a counter molding machine of the character described, having mold parts adapted to be separated vertically by a narrow gap for admitting a counter blank to be molded by subsequent pressure between said mold parts, a carrier for presenting a counter blank to the mold, said carrier including a member adapted to rock upwardly towards and downwardly away from the mold, and jaws mounted upon said member, said jaws adapted to grip a counter blank inserted therein, means for rocking said member in timed relation to the movements of the machine, the upward rocking movement of said member causing said counter blank to enter edgewise in the gap between said mold parts when separated, said jaws retaining their engagement with said blank after it has entered into said gap, mechanical means for disengaging said jaws to release the blank in advance of the descent of the wiper, and manual means for disengaging said jaws in the down position of said member when rocked away from the mold for insertion of a fresh blank.

5. In a counter molding machine of the character described, a shaft operating the molding means, a main clutch controlling the drive to said shaft, a carrier for presenting a counter blank to the mold, an auxiliary clutch, means for engaging said auxiliary clutch to initiate a molding operation, means controlled by said auxiliary clutch for engaging said main clutch, other means controlled by said auxiliary clutch for moving said carrier towards and away from the mold in timed relation to the movements of the machine, and positive means controlled by said shaft for disengaging said main clutch at the end of each molding operation, said positive disengaging means controlling said means for engaging said auxiliary clutch.

6. In a counter molding machine of the character described, a shaft operating the molding means, a main clutch controlling the drive to said shaft, a carrier for presenting a counter blank to the mold, an auxiliary clutch, means for engaging said auxiliary clutch to initiate a molding operation, means for disengaging said auxiliary clutch at the end of each molding operation, means controlled by said auxiliary clutch for engaging said main clutch, other means controlled by said auxiliary clutch for moving said carrier towards and away from the mold in timed relation to the movements of the machine, and positive means controlled by said shaft for disengaging said main clutch at the end of each molding operation, said positive disengaging means controlling said means for engaging said auxiliary clutch.

7. In a counter molding machine of the character described having a shaft revolving once for each molding operation, and a main clutch controlling the drive to said shaft, the combination of an auxiliary clutch, means for engaging said auxiliary clutch to initiate a molding operation, means controlled by said auxiliary clutch for engaging said main clutch, positive means controlled by said shaft for disengaging said main clutch at the completion of one revolution of said shaft, and other means for disengaging said auxiliary clutch at the end of each molding operation.

8. In a counter molding machine of the character described having a shaft revolving once for each molding operation, and a main clutch controlling the drive to said shaft, the combination of an auxiliary clutch, manual means for engaging said auxiliary clutch to initiate a molding operation, means controlled by said auxiliary clutch for engaging said main clutch, positive means controlled by said shaft for disengaging said main clutch at the completion of one revolution of said shaft, other means for disengaging said auxiliary clutch at the end of each molding operation, and supplementary means for ensuring the disengagement of said auxiliary clutch at the completion of one revolution of said shaft in the event of continued operation of said manual means for engaging said auxiliary clutch.

9. In a counter molding machine of the character described having a shaft revolving once for each molding operation, and a main clutch controlling the drive to said shaft, the combination of a carrier for presenting a counter blank to the mold, said carrier including a member adapted to rock towards and away from the mold, a rocking shaft on which said carrier member is mounted, a crank mounted on said rocking shaft, a cam shaft having a cam adapted to engage said crank for moving said carrier member towards the mold, an auxiliary clutch for conveying rotary motion to said cam shaft, means for engaging said auxiliary clutch to initiate a molding operation, means for engaging said main clutch by rotation of said cam shaft means for disengaging said main clutch at the completion of one revolution of the first mentioned shaft, and other means for disengaging said auxiliary clutch at the completion of one revolution of said cam shaft.

10. In a counter molding machine of the character described, a carrier for presenting a counter blank to the mold, said carrier including a member adapted to rock towards and away from the mold and means for gripping a counter blank in a position for entering the mold as said carrier member rocks towards the mold, a rocking shaft on which said carrier member is mounted, a crank mounted on said rocking shaft, means normally securing said crank to said rocking shaft, a cam shaft having a cam adapted to engage said crank for moving said carrier member towards the mold, means for revolving said cam shaft in timed relation to the operation of the machine, and a safety device for disengaging said crank from said rocking shaft during the descent of the wiper over the face of the mold in the event of failure of said cam shaft revolving means.

11. In a counter molding machine of the character described, a carrier for presenting a counter blank to the mold, comprising a member adapted to rock towards and away from the mold, spring means for gripping a counter blank upon said member in a position for entering the mold as said member rocks towards the mold, manual means for releasing said gripping means at the insertion of a counter blank therein, and means attached to the wiper of the machine for releasing said gripping means as the wiper begins to descend over the face of the mold after entry of the counter blank into said mold.

12. In a counter molding machine of the character described, a carrier for presenting a counter blank to the mold, comprising a member adapted to rock towards and away from the mold, spring means tending to move said member away from the mold, mechanical means for moving said member towards the mold in timed relation to the operation of the machine, other spring means for gripping a counter blank upon said member in a position for entering the mold as said member rocks towards the mold, manual means for releasing said gripping means at the insertion of a counter blank therein, means attached to the wiper of the machine for releasing said gripping means as the wiper begins to descend over the face of the mold after entry of the counter blank into said mold, and other mechanical means for moving said member away from the mold as the wiper descends, said other mechanical means including a safety device for disengaging the first mentioned mechanical means to allow of moving said member away from the mold as the wiper descends.

13. In a counter molding machine of the character described having a shaft revolving once for each molding operation, a main shaft driving said revolving shaft, and a clutch conveying motion to said driving shaft during each molding operation, means for delivering the molded counter as the machine comes to rest at the end of each molding operation comprising a rocking member having frictional engagement with said driving shaft, a spring acting on said rocking member to rock it in the opposite direction to that due to its frictional engagement, and mechanical connections from said rocking member to the center piece of the mold whereby said rocking member maintains the center piece within the mold during forward rotation of said driving shaft but is caused by the action of said spring to rock the center piece and deliver the molded counter clear of the mold when said driving shaft comes to rest upon the disengagement of said clutch.

14. A blank-presenting attachment for a shoe heel counter molding machine including a driving shaft, a main clutch, a bottom shaft, and a bottom plunger and mold parts operated by said bottom shaft, comprising a bracket, means for mounting said bracket to rise and fall with the bottom plunger of the machine, a shaft rockably mounted in said bracket, a blank carrier secured to said shaft, a crank arm upon said shaft, said blank carrier and crank arm extending in approximately opposite directions from the axis of said shaft, a cam mechanism mounted on one side of the machine, said cam mechanism engaging said crank arm to rock said blank carrier for presenting a counter blank to the mold parts of the machine, a countershaft mounted on the side of the machine rearwardly of said cam mechanism, a clutch mounted on said countershaft, means adapted to the driving shaft of the machine for driving said countershaft, means for driving said cam mechanism from said countershaft, said clutch controlling one of said driving means, means adapted to the normal machine control for engaging said clutch to initiate a molding operation, and means operated by said cam mechanism for engaging the main clutch of the machine in timed relation to the rocking of said blank carrier, said last-mentioned means being mounted upon the machine between said cam mechanism and said main clutch.

15. A blank-presenting attachment for a shoe heel counter molding machine including a driving shaft, a main clutch, a bottom shaft, and a bottom plunger and mold parts operated by said bottom shaft, comprising a bracket, means for mounting said bracket to rise and fall with the bottom plunger of the machine, a shaft rockably mounted in said bracket, a blank carrier secured to said shaft, a crank arm upon said shaft, said blank carrier and crank arm extending in approximately opposite directions from the axis of said shaft, a cam mechanism mounted on one side of the machine, said cam mechanism engaging said crank arm to rock said blank carrier for presenting a counter blank to the mold parts of the machine, a countershaft mounted on the side of the machine rearwardly of said cam mechanism, a clutch mounted on said countershaft, means adapted to the driving shaft of the machine for driving said countershaft, means for driving said cam mechanism from said countershaft, said clutch controlling one of said driving means, means adapted to the normal machine control for engaging said clutch to initiate a molding operation, means operated by said cam mechanism to maintain said clutch engaged for one cycle of said cam mechanism, and means operated by said cam mechanism for engaging the main clutch of the machine in timed relation to the rocking of said blank carrier, said last-mentioned means being mounted upon the machine between said cam mechanism and said main clutch and including means for disconnecting said clutch-engaging means from the normal machine control.

16. A blank-presenting attachment for a shoe heel counter molding machine including a driving shaft, a main clutch, a bottom shaft, and a bottom plunger and mold parts operated by said bottom shaft, comprising a bracket, means for mounting said bracket to rise and fall with the bottom plunger of the machine, a shaft rockably mounted in said bracket, a blank carrier secured to said shaft, a crank arm upon said shaft, said blank carrier and crank arm extending in approximately opposite directions from the axis of said shaft, a cam mechanism mounted on one side of the machine, said cam mechanism engaging said crank arm to rock said blank carrier for presenting a counter blank to the mold parts of the machine, a countershaft mounted on the side of the machine rearwardly of said cam mechanism, a clutch mounted on said countershaft, means adapted to the driving shaft of the machine for driving said countershaft, means for driving said cam mechanism from said countershaft, said clutch controlling one of said driving means, means adapted to the normal machine control for engaging said clutch to initiate a molding operation, means operated by said cam mechanism to maintain said clutch engaged for one cycle of said cam mechanism, means operated by said cam mechanism for engaging the main clutch of the machine in timed relation to the rocking of said blank carrier, said last-mentioned means being mounted upon the machine between said cam mechanism and said main clutch, and means adapted to the bottom shaft of the machine for disengaging said main clutch at the completion of one revolution of said bottom shaft.

WILLIAM HEDGER CHAMBERLAIN.